Sept. 6, 1938.   A. J. FISCHER   2,129,267
SEWAGE TREATMENT
Filed Feb. 28, 1935
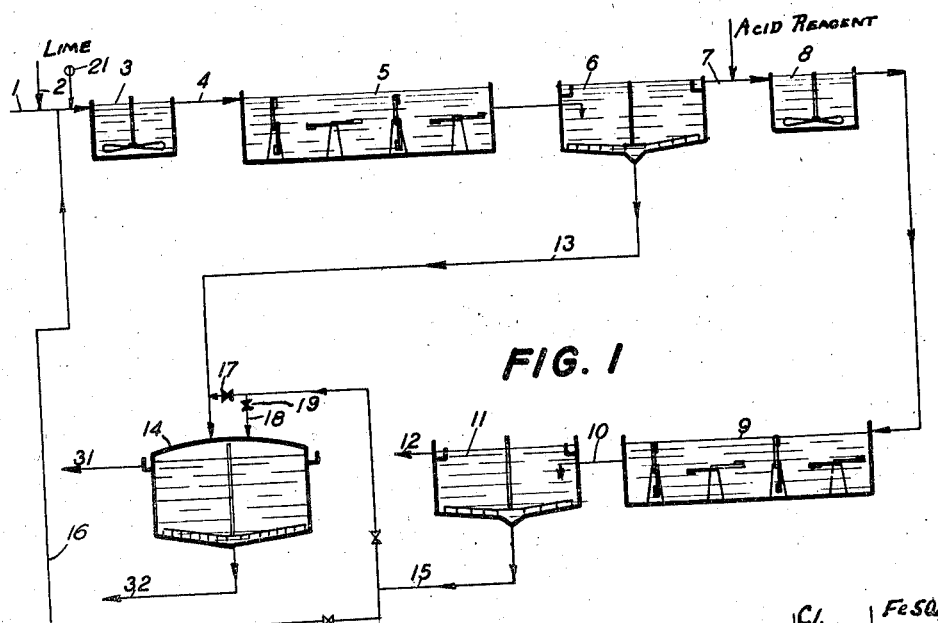
FIG. 1
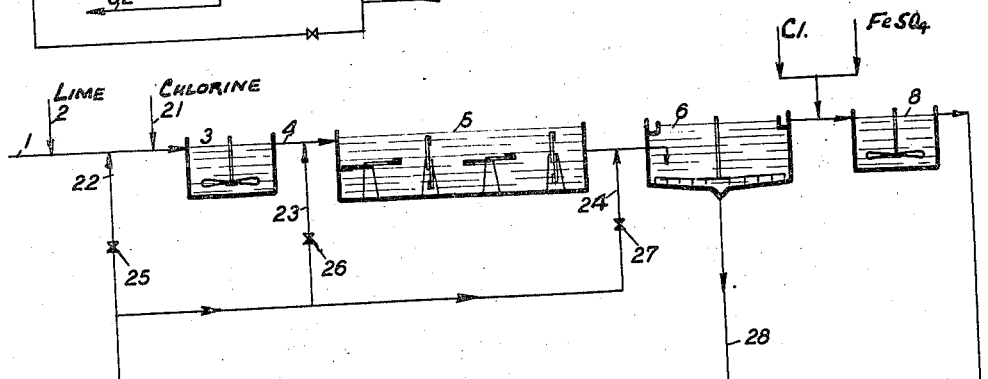
FIG. 2
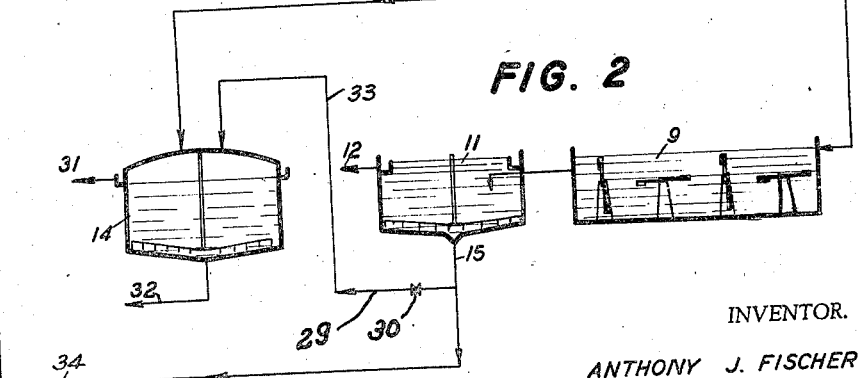
INVENTOR.
ANTHONY J. FISCHER
BY *Arthur Middleton*
ATTORNEY.

Patented Sept. 6, 1938

2,129,267

UNITED STATES PATENT OFFICE 2,129,267

SEWAGE TREATMENT

Anthony J. Fischer, Jackson Heights, Long Island, N. Y., assignor to The Dorr Company, Inc., New York, N. Y., a corporation of Delaware Application February 28, 1935, Serial No. 8,584

3 Claims. (Cl. 210—2)

The present invention relates to the treatment of sewage and analogous organic wastes.

Heretofore, in the purifying of sewage by steps involving sedimentation for obtaining on the one hand a resulting effluent sufficiently clear to deliver to streams or other places for suitable disposition thereof, and on the other obtaining from the sedimentation of organic solids a disposable sewage sludge, there has been attempted the employing of coagulants or precipitating agents. In certain processes as heretofore attempted, certain disadvantages have been experienced because of the colloidal and slimy nature of the resulting sewage sludge, and which were of a character that necessitated specific modes of handling the sludge, particularly incident to the disposing thereof. In fact, according to certain of the prior modes of sewage disposition, where coagulating reagents have been used, it has been customary to handle the sludge by a process involving the dewatering of the same by spreading it over drying beds. Even with this type of disposition, certain troubles are experienced because of the nature of the sludge. In certain other processes heretofore attempted primary and secondary sedimentation have been employed with chemical dosing between the sedimentation steps and the resulting sludges subjected to digestion. In that instance where acid reagents were used the resulting mixed sludges tended toward predominating acid characteristics and on the contrary where alkaline reagents were used the resulting mixed sludges tended toward predominating alkaline characteristics. Extremes of either of these characteristics are detrimental to digestion and the present invention has in view the producing of sludge more readily responsive to bacteriological digestion.

According to the present invention multi-stage chemical dosing and a multi-stage sedimentation are employed with a consequent collecting or disposal of the sludge from each sedimentation stage, according to steps involving the ultimate digesting of the solids content of the sewage sludge, and all of this without the experiencing of difficulties such as those above referred to.

According to certain modes of realizing the invention, raw sewage is subjected to a lime dosing—sometimes referred to as "liming"—and which involves adding and mixing a reagent to supply the requisite lime or analogous alkaline reacting constituent, whereby there is provided for the incoming sewage that chemical reagent which aids or furthers the chemical coagulation and precipitation of the solids, and which also insures an alkaline characteristic of the sewage, and more particularly of the sewage sludge derivable as the result of said primary sedimentation. Provision is also preferably made for a flocculation operation between this primary alkaline dosing and the primary sedimentation.

According to the second chemical dosing and second sedimentation stage, a chemical reagent is supplied to and mixed with the effluent from the primary sedimentation, as for example, alum, ferric chloride or chlorinated ferrous sulfate (chlorinated copperas), of a character to cause flocculation and to aid ultimate chemical precipitation of the solids content that still exists in the effluent from, and thus escapes from, the primary sedimentation. This second chemical treatment is properly referred to as a second chemical dosing and is of a character to neutralize or diminish the alkalinity in the effluent or to substantially do so. This second dosing is preferably followed by a period for allowing floc to develop and after this flocculation period the effluent is subjected to secondary sedimentation, with the result that a chlorinated and relatively sterile effluent passes from the secondary sedimentation, and with the result that a sedimented sludge is derivable from the secondary sedimentation which is relatively neutral or at the most has only slightly acid or alkaline characteristics. The sludge from this secondary sedimentation being relatively neutral or only slightly acid or alkaline is employed to modify the alkalinity experienced in connection with the settled solids derivable from the sedimentation of the limed-dosed sewage as carried out in the primary sedimentation zone. This modifying of the highly alkaline solids by the mixing or inter-mixing therewith of the relatively neutral or only slightly acid or alkaline solids derivable from the secondary sedimentation may be accomplished by effecting the mixing of the sludge from the primary sedimentation with the sludge from the secondary sedimentation at a location—for example in a digester—which is outside of either the primary or secondary sedimentation, while according to another form or mode of realizing this feature of the invention, the sludge from the secondary sedimentation may be passed to an earlier portion of the process, whereby it will be subject to a sedimentation in the primary sedimentation basin, together with the other solids initially precipitated following the lime dosing of the incoming sewage.

Patentable aspects of the invention revolve about the features above referred to, which characteristically typify the essence of the present invention and the novelty thereof over the prior attempted practices.

The novel features that are considered characteristic of this invention are set forth with particularity in the appended claims. The invention itself, however, both as to its organization and mode of operation, together with objects and advantages thereof, will best be understood from the following description of the specific embodiments when read in connection with the accompanying drawing forming a part of this specification.

In said drawing each figure thereof illustrates a system or arrangement having apparatus providing for multi-stage chemical dosing and multi-stage sedimentation of sewage sludge, and also employing a digester, wherein the solids content of the sewage as derived from the sewage sludges obtained from primary and secondary sedimentation zones are subjected to anaerobic biologic digestion with the consequent production of a combustible gas.

In Fig. 1, an arrangement is shown in which there is arranged in series a mixing apparatus into which chemically dosed raw sewage is fed and mixed, from which the dosed, mixed sewage passes to a flocculation zone, thence to a primary clarifier providing an initial sedimentation basin or zone from which the effluent passes, is dosed and then passes to a mixer, thence to another flocculation zone and ultimately to a secondary clarifier providing a secondary sedimentation basin or zone, and from the latter of which the clarified effluent passes to the river or to other place of disposal. According to the arrangement of this figure, sludge derived from the primary sedimentation and sludge derived from the secondary sedimentation is passed to a digester and these sludges are either mixed ahead of the digester or in the digester.

According to Fig. 2 there is an arrangement of initial mixer, initial flocculation zone, initial clarifier, secondary mixer, secondary flocculation zone and secondary clarifier practically after the order of Fig. 1, but in the arrangement of Fig. 2, the sludge derivable as a result of the primary clarifier or primary sedimentation is passed directly to the digester. Sludge derivable from the secondary sedimentation is passed back and introduced into the incoming sewage stream, either ahead of the initial mixer, initial flocculation zone or initial clarifier.

Reference is now made to the drawing in detail:

The incoming sewage is supplied along the path 1, and lime or other alkaline dosing reagent is supplied thereto at the point 2. The thus dosed incoming sewage enters the mixer or agitator 3, wherein an intimate or relatively thorough mixing of the dosing material with the incoming sewage is insured or effected, and therefrom the incoming sewage to which the alkaline reagent has thus been supplied and intimately mixed passes, as along the path 4 into the primary flocculation zone 5, thence to and into primary clarifier 6, wherein the primary sedimentation is carried out so that there is realized a substantial settling of the organic solid content of the sewage. This settling is aided or furthered as a result of the chemical dosing treatment which effects a coagulation or precipitation of the organic solid content in the sewage. The dosing by lime or other suitable alkalizing material is also sufficient to insure the imparting of a relatively alkaline condition to the raw sewage or, to the sewage sludge or sediment obtainable as a result of said primary sedimentation, provided nothing else is added to overcome or lessen the alkaline characteristic, an effect which is particularly realized by the operation as carried out in Fig. 1.

The supernatant within the primary clarifier passes as effluent therefrom along the path 7 and a second dosing is effected by the supplying of a chemical acid reagent to the effluent and the effecting of a substantial and intimate mixing of the thus added chemical by the secondary mixing or agitator means 8. The chemical or acidulating agent added at this point is of an acid character that substantially decreases or neutralizes and thus modifies the alkalinity of the effluent. In other words, the acid chemical thus added is sufficient to cause the effluent to be left neutral or only slightly acid or alkalized. This chemical is also of a character to aid or encourage flocculation and therefore there has been provided a further flocculation zone 9 that receives the dosed effluent flowing thereto from the mixer 8. The effluent flow has a slow movement through the flocculation zone whence it is preferably subjected to slow agitative movement produced, such as by paddles within, under conditions to facilitate flocculation. Therefrom the effluent with the flocs formed therein passes along the path 10 into the secondary clarifier or sedimentation basin 11. In this secondary sedimentation basin the sewage liquid therein is retained for a sufficient time to effect a substantial sedimentation of the solids remaining therein with the result that the supernatant thereof passes therefrom as a relatively clarified effluent along the path 12.

The sewage sludge derivable from the primary clarifier in the form of an alkaline sludge is withdrawn from the primary clarifier and passes therefrom along the path 13 to the digester 14, wherein anaerobic biologic digestion of the sludge is carried out, or in other words wherein a digestion treatment is carried out that is effective upon the sludge or sludges therein while in a state of liquid consistency during the course of digestion treatment. The sludge or sediment resulting from the secondary sedimentation is collected and withdrawn from the secondary clarifier or sedimentation basin 11 and passes therefrom along the path 15, by which it is delivered at 16 into the sewage sludge flowing from the primary clarifier to the digester along the path 13, providing the valve at 17 is open. As an alternative, the sewage sludge from the secondary clarifier can be passed along the path 15 and be delivered at 18, provided the valve at 19 is open, directly to the digester wherein it is intimately mixed with and the sludge supplied to the digester along the path 13, thus providing within the digester a sludge mixture wherein the solids thereof undergo con-current digestion.

If desired, some or all of the sludge can be passed from the secondary sedimentation basin along the path 16 for introduction into the incoming sewage prior to the primary or initial sedimentation. Sludge thus passed from the secondary sedimentation into the incoming sewage may be referred to as return sludge and may be introduced into the incoming sewage under conditions whereby it is mixed with the latter together with lime supplied as along the line 2 and with antiseptic chlorines supplied as along line 21. Such antiseptic chlorines will have a sterilizing action that will continue in the supernatant effluents as delivered from the primary sedimentation and as delivered from the secondary sedimentation.

The flocculating zones or apparatus indicated at 5 and 9 are for obtaining generally the effects of the teachings of the Smith Patent No. 1,893,451 of January 3, 1933, namely, that floc nuclei initiated or yielded by chemical or other action, are conditioned as the liquid bearing them passes or drifts through the flocculating zone which is equipped with current-producing devices, characterized by a plurality of paddle-like assemblies, including blades moving in repetitive paths, which in the embodiment illustrated have substantially horizontal axes. By virtue of the gentle agitative effects produced by the paddle-like assemblies, the flocs and particles of turbidity in the liquid are amassed, coagmented or developed into integrated flocs that have been conditioned into settleability.

The sedimentation zones, or settlers, 6 and 11 are preferably what is known as clarifiers that are continually operating tanks provided with an overflow launder for effluent, and a travelling sediment-raking or scraping mechanism for discharging sludge from the tanks.

The mixers 3 and 8 are preferably rapid-mixing or agitator devices that are well known.

The chemicals usable for alkalizing the sewage or polluted liquid are lime or other alkaline material, while the acid reacting or acidulating chemicals should produce ultimately an environment that has no substantial toxic effect upon the organisms in the biologic digester 14. Preferably they should be the chlorides or sulphates of iron, aluminum or zinc, or possibly mixtures thereof.

The digester 14 is preferably of some known type wherein anaerobic bacterial or biologic conversion or digestion takes place for the rendering inert and innocuous of putrescible and other organics of the sewage sludge.

The arrangement of Fig. 2 comprises an initial mixer 3, an initial flocculation zone 5, an initial or primary clarifier or sedimentation basin 6, a secondary mixer 8, a secondary flocculation zone 9 and a secondary clarifier or secondary sedimentation basin 11 having embodiments of the same arrangement as that shown in Fig. 1, and therefore like numbers have been accorded to the like parts of both Figs. 1 and 2. In the arrangement of Fig. 2 there is indicated a liming supply at 21, whereby the limed or a chlorine supply at 21, whereby the limed or alkaline dosed incoming sewage can to a certain extent be chlorinated, thus rendering sterile to a certain extent the incoming sewage. Also according to this Fig. 2 the secondary clarifier is shown as having a connection whereby the sewage sludge derived as a result of the secondary sedimentation can be introduced into the incoming sewage as at any of the points 22, 23 or 24, according to which of the respective valves 25, 26 or 27 is open. Thus it will be seen that the initial mixer can be relied upon to effect an intimate mixing of all materials or substances introduced into the sewage ahead of the initial mixer 3, such as lime or other alkaline dosing or coagulating material or sewage sludge derived from the secondary sedimentation and which is passed back to the incoming sewage, or the chlorine supplied at 21. In the primary clarifier, a sedimentation of the incoming sewage thus supplied takes place and it will be noted that the passed back secondary sludge can be relied upon to modify or to a certain extent to decrease the alkalinity which would otherwise be imparted as the result of the liming or other alkaline dosing operation.

As previously indicated, other alternatives indicated by this figure is the possibility of introducing the secondary sludge into the dosed and chlorinated sludge leaving the mixer, to wit: by introducing the passed back secondary sludge at the point 23 or the point 24. In this Fig. 2 there is also indicated the introduction or application of a chemical reagent having a strong acid radical, to wit, chlorinated ferrous sulfate or chlorinated copperas, which ingredients result from the prior chemically combining of Cl and FeSO$_4$ as a chemically reactive product into the clarified effluent leaving the primary clarifier but prior to the introduction of said clarified effluent into the secondary mixer. The chlorine component thus supplied by the chlorinated copperas is relied upon for rendering still more sterile the liquid component of the effluent and whereby this sterile condition exists not only in the supernatant liquid in the secondary clarifier but also in the effluent leaving the secondary clarifier and which is provided by the supernatant liquid therein. The copperas is added prior to the mixing in order to aid in the ultimate flocculation which is carried out in the flocculation zone 9 and thus ultimately aiding in the throwing down as a result of the sedimentation the solids content remaining in the effluent.

In the arrangement of this Fig. 2 it will be noted that the only sludge thus far described as supplied to the digester 14 is that which is supplied thereto from the primary clarifier along the path 28, this is because the sludge from the primary clarifier not only contains the solids deposited for the first time therein, but it also has intermixed solids introduced into the incoming sewage as the result of the passing back into the incoming sewage of sewage sludge derived as the result of the said secondary sedimentation. It is therefore apparent that the sludge derived as the result of the primary clarification in this arrangement also includes some solids which have been passed back into the incoming sewage and which have been reprecipitated in the primary or initial clarifier.

It will be manifest also that the arrangement and steps described in Figs. 1 and 2, can be modified and still be within the scope and purview of the invention, as for example it would be possible to pass some of the sludge derived from the secondary sedimentation directly to the digester and to pass other portions of the sludge derived from the secondary sedimentation into the incoming sewage at a point ahead of the primary clarifier, as for example by passing some portion of the sludge from the line 15 along paths 29 and 33, assuming valve at 30 is open, and by passing other portions of the sludge along line 22, assuming valve 25 is open.

The design may have effluent discharge means indicated at 31 and digested sludge discharge means indicated at 32.

From the foregoing description relating to the arrangement of this Figure 2, it will be manifest that according to the will of an operator the sludge from the secondary sedimentation basin 11 can be passed, either all thereof or only a part thereof, along the path 15, 34 and 22 to the line 1 along which incoming sewage passes on its way to the treating system, or if desired, all of the sludge from the secondary basin 11 or any part thereof can be passed along the path 29 and 33 to and into digester 14.

It is to be noted that while lime or other alkaline or alkalizing reagents may be used in the initial coagulation step, the amount of such lime or other alkaline reagent is much less than would be required if there were no second or acid coagulation step employed in the process. Moreover, in other processes where only an acid coagulation has been employed, a satisfactory clarification was not always obtainable within reasonable limits of applied acid reagents. The combining of the two chemically dissimilar coagulating steps as herein outlined effect the ultimate desired clarification with a relatively small amount of or a lesser cost for chemical reagents. The separation of the application of these chemically different steps also leads to greater economy over a process wherein both chemicals are added simultaneously. These advantages are over and above those outlined as regards the mere sludge digestion.

The diagrams of the figures illustrated, together with the description hereby presented, clearly indicate the flexibility of the process and various ways in which the invention can be realized and carried out, and still remain within the purview and scope thereof as defined in and by the claims.

I claim:

1. The method of treating sewage and the like, and the digesting of sludge therefrom, which comprises mixing with the sewage an alkali reactable therewith to impart to the sewage as well as to sludge derived therefrom alkaline characteristics, subjecting the alkalized sewage to primary sedimentation, separately withdrawing as a result of said sedimentation an alkaline sludge and supernatant effluent liquid, mixing with said effluent an acidulating agent reactable therewith having a strong acid radical to impart to the sludge derived therefrom preferably neutral but at most only slightly acid characteristics, subjecting said withdrawn effluent liquid to secondary sedimentation, separately withdrawing as a result of said secondary sedimentation non-alkaline sludge and a clarified effluent, mingling said thus derived sludges, and treating the mingled sludges by anaerobic biologic digestion.

2. The method of treating sewage and the like, and the digesting of sludge therefrom, which comprises mixing with the sewage an alkali reactable therewith to impart to the sludge derived therefrom alkaline characteristics, subjecting the alkalized sewage to primary sedimentation, separately withdrawing as a result of said sedimentation an alkaline sludge and supernatant effluent liquid, mixing with said effluent an acidulating agent reactable therewith having a strong acid radical to impart to the sludge derived therefrom preferably neutral but at most only slightly acid characteristics, flowing said mixture through a flocculation zone equipped with current-producing devices characterized by a plurality of paddle-like assemblies including blades moving in repetitive paths for yielding from said mixture coagmented and amassed flocs conditioned into settleability, subjecting flocculated liquid therefrom to secondary sedimentation, separately withdrawing as a result of said secondary sedimentation flocculated non-alkaline sludge and a clarified effluent, mingling said thus derived sludges, and treating the mingled sludges by anaerobic biologic digestion.

3. The method of treating sewage and the like, and the digesting of sludge therefrom, which comprises mixing with the sewage an alkali reactable therewith to impart to the sludge derived therefrom alkaline characteristics, flowing said sewage through a first flocculation zone equipped with current-producing devices characterized by a plurality of paddle-like assemblies including blades moving in repetitive paths for yielding from said mixture coagmented and amassed flocs conditioned into settleability, subjecting the flocculated sewage to primary sedimentation, separately withdrawing as a result of said sedimentation an alkaline sludge and supernatant effluent liquid, mixing with said effluent an acidulating agent reactable therewith having a strong acid radical to impart to the sludge derived therefrom preferably neutral but at most only slightly acid characteristics, flowing said mixture through a second flocculation zone like the first, subjecting flocculated liquid therefrom to secondary sedimentation, separately withdrawing as a result of said secondary sedimentation flocculated non-alkaline sludge and a clarified effluent, mingling said thus derived sludges, and treating the mingled sludges by anaerobic biologic digestion.

ANTHONY J. FISCHER.